(12) United States Patent
Abe

(10) Patent No.: US 11,251,640 B2
(45) Date of Patent: Feb. 15, 2022

(54) ELECTRONIC APPARATUS AND CONTROL METHOD

(71) Applicant: CANON KABUSHIKI KAISHA, Tokyo (JP)

(72) Inventor: Takamitsu Abe, Asaka (JP)

(73) Assignee: Canon Kabushiki Kaisha, Tokyo (JP)

(*) Notice: Subject to any disclaimer, the term of this patent is extended or adjusted under 35 U.S.C. 154(b) by 107 days.

(21) Appl. No.: 16/879,290

(22) Filed: May 20, 2020

(65) Prior Publication Data
US 2020/0373774 A1    Nov. 26, 2020

(30) Foreign Application Priority Data

May 23, 2019 (JP) .............................. JP2019-096768

(51) Int. Cl.
*H01M 10/44* (2006.01)
*H01M 10/46* (2006.01)
*H02J 7/00* (2006.01)

(52) U.S. Cl.
CPC .......... *H02J 7/0071* (2020.01); *H02J 7/00032* (2020.01); *H02J 7/0042* (2013.01)

(58) Field of Classification Search
CPC .... H02J 7/0071; H02J 7/0042; H02J 7/00712; H02J 7/00032; H01M 10/44; H01M 10/46; H01M 10/48; H01M 10/425; H01M 10/448

USPC ....... 320/107, 125, 132, 134, 136, 149, 152, 320/157, 160, 162; 340/636.1, 636.12, 340/636.13, 636.15, 636.2; 702/63.64

See application file for complete search history.

(56) References Cited

U.S. PATENT DOCUMENTS 6,118,250 A * 9/2000 Hutchison, IV ...... H02J 7/0071
                                                     320/160

FOREIGN PATENT DOCUMENTS

JP          2001-309568 A      11/2001

* cited by examiner

*Primary Examiner* — Edward Tso
(74) *Attorney, Agent, or Firm* — Canon U.S.A., Inc. IP Division

(57) ABSTRACT

An electronic apparatus includes a charging unit configured to charge a battery, and a control unit. The control unit is configured to control the charging unit to charge the battery based on a first charging condition, in a case where an operable time of the electronic apparatus from a charging completed state to a discharging completed state is not less than a predetermined threshold. The control unit is configured to control the charging unit to charge the battery based on a second charging condition in which a full charge capacity of the battery is greater than in the first charging condition, in a case where an operable time of the electronic apparatus from a charging completed state to a discharging completed state is less than the predetermined threshold.

5 Claims, 3 Drawing Sheets

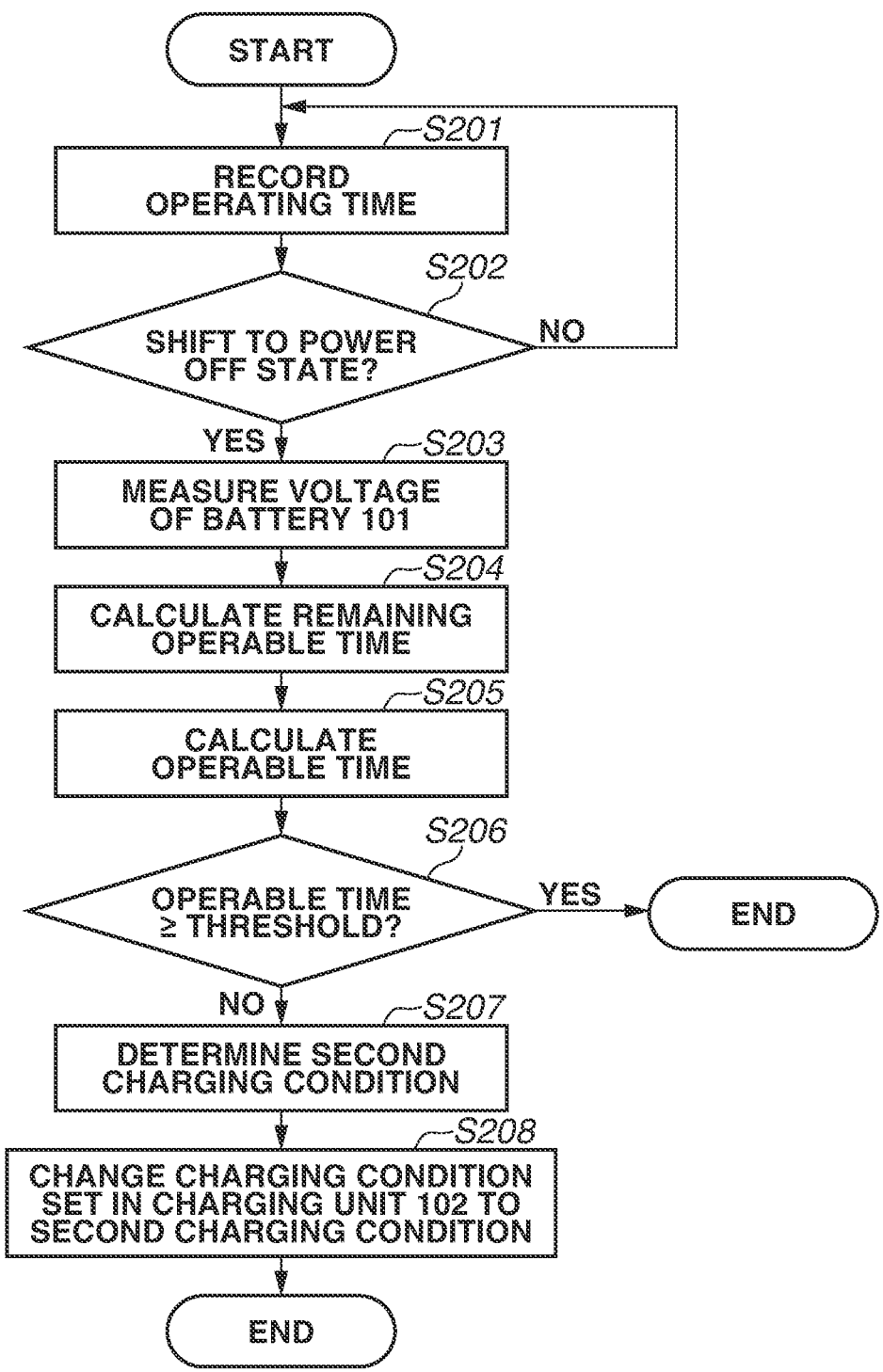

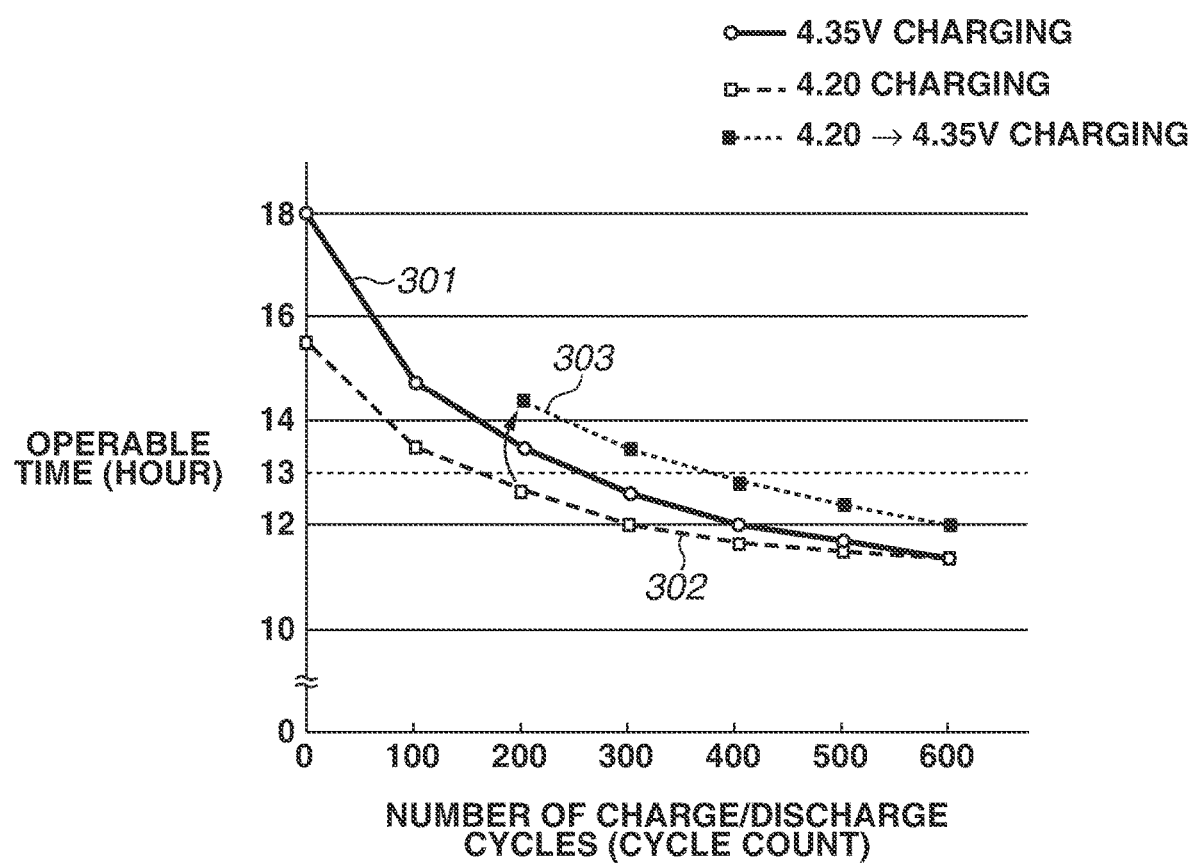

ELECTRONIC APPARATUS AND CONTROL METHOD

BACKGROUND

Field of the Invention

Aspects of the present disclosure generally relate to an electronic apparatus that operates with power supplied from a battery, and a control method thereof.

Description of the Related Art

Japanese Patent Application Laid-Open No. 2001-309568 discusses an intelligent battery including a microprocessor that acquires information about deterioration of the battery.

A battery can be prevented from deteriorating by reducing a full charge capacity of the battery. In this case, however, the operable time of an electronic apparatus becomes short because the full charge capacity of the battery is reduced. Even if it is desirable to operate the electronic apparatus for a predetermined operating time, the battery may be exhausted before the predetermined operating time elapses, depending on the full charge capacity of the battery.

SUMMARY

According to an aspect of the embodiments, an operable time of an electronic apparatus that operates with power supplied from a battery is adjustable.

According to an aspect of the embodiments, there is provided an electronic apparatus including a charging unit that charges a battery, and a control unit that (a) controls the charging unit to charge the battery based on a first charging condition, in a case where an operable time of the electronic apparatus from a charging completed state to a discharging completed state is not less than a predetermined threshold, and (b) controls the charging unit to charge the battery based on a second charging condition in which a full charge capacity of the battery is greater than in the first charging condition, in a case where an operable time of the electronic apparatus from a charging completed state to a discharging completed state is less than the predetermined threshold.

According to an aspect of the embodiments, there is provided a method including causing a charging unit of an electronic apparatus to charge a battery, controlling the charging unit to charge the battery based on a first charging condition, in a case where an operable time of the electronic apparatus from a charging completed state to a discharging completed state is not less than a predetermined threshold, and controlling the charging unit to charge the battery based on a second charging condition in which a full charge capacity of the battery is greater than in the first charging condition, in a case where an operable time of the electronic apparatus from a charging completed state to a discharging completed state is less than the predetermined threshold.

According to an aspect of the embodiments, there is provided a non-transitory storage medium storing a program for causing a computer to execute a method, the method including causing a charging unit of an electronic apparatus to charge a battery, controlling the charging unit to charge the battery based on a first charging condition, in a case where an operable time of the electronic apparatus from a charging completed state to a discharging completed state is not less than a predetermined threshold, and controlling the charging unit to charge the battery based on a second charging condition in which a full charge capacity of the battery is greater than in the first charging condition, in a case where an operable time of the electronic apparatus from a charging completed state to a discharging completed state is less than the predetermined threshold.

Further aspects of the embodiments will become apparent from the following embodiments.

BRIEF DESCRIPTION OF THE DRAWINGS

FIG. 2 is a flowchart illustrating a control method of the electronic apparatus 100.

FIG. 3 is a graph illustrating a relationship between the number of charge/discharge cycles of a battery 101 and an operable time of the electronic apparatus 100.

DESCRIPTION OF THE EMBODIMENTS

Figure 1:
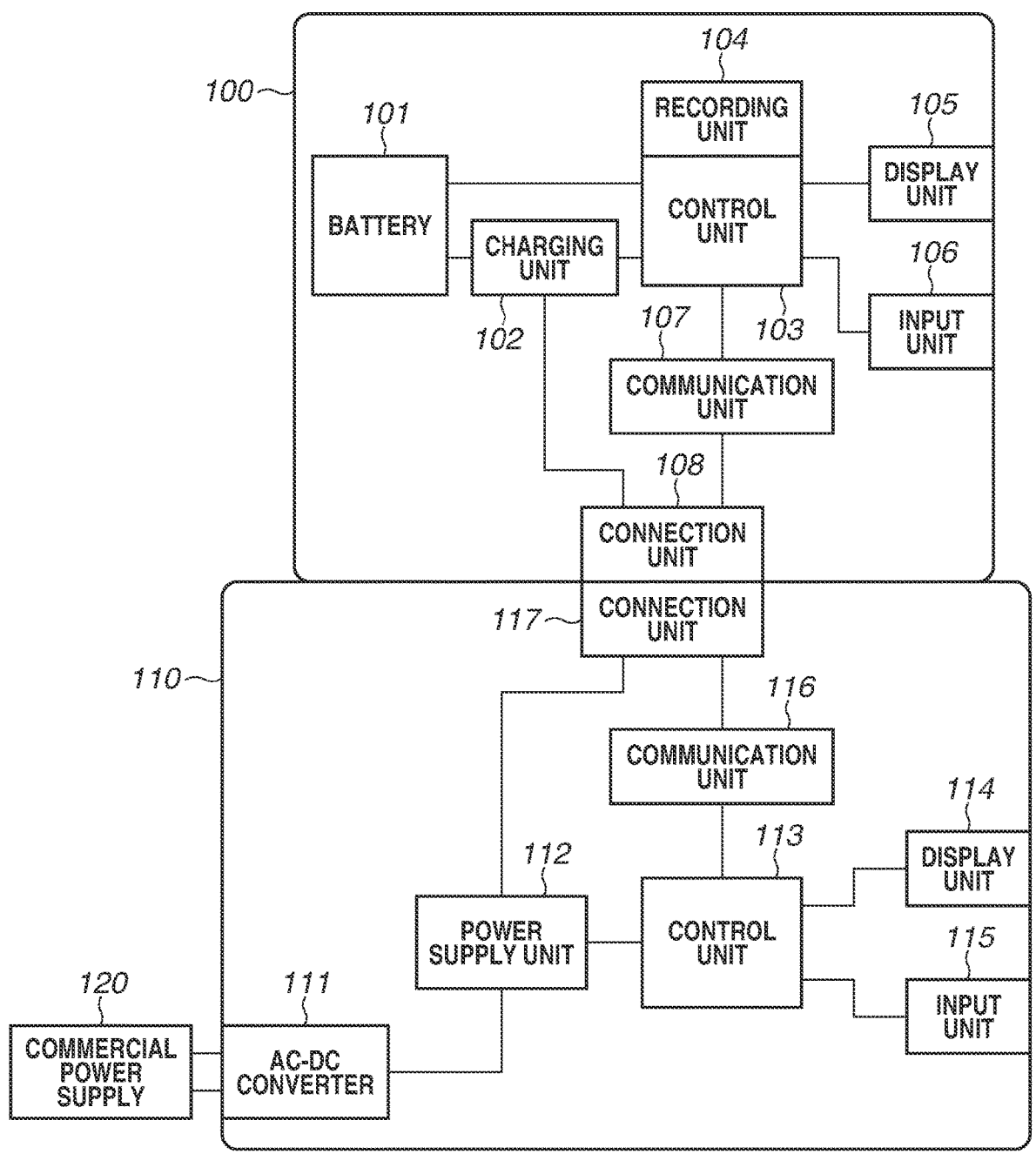
FIG. 1 is a block diagram illustrating components of an electronic apparatus 100 and components of a charger 110.

Exemplary embodiments, features, and aspects of the present disclosure will be described below with reference to the drawings. However, aspects of the present disclosure are not limited to the following embodiments.

First Exemplary Embodiment

FIG. 1 is a block diagram illustrating components of an electronic apparatus 100 according to a first exemplary embodiment and components of a charger 110 according to the first exemplary embodiment.

The charger 110 is connected to the electronic apparatus 100. The charger 110 operates with power supplied from a commercial power supply 120. The charger 110 supplies power to the electronic apparatus 100 to charge a battery 101 within the electronic apparatus 100. The charger 110 includes an alternating current to direct current (AC-DC) converter 111, a power supply unit 112, a control unit 113, a display unit 114, an input unit 115, a communication unit 116, and a connection unit 117.

The AC-DC converter 111 converts an AC voltage of the commercial power supply 120 into a DC voltage to be easily used for charging. The power supply unit 112 supplies power to a charging unit 102 of the electronic apparatus 100 via the connection unit 117 and a connection unit 108. A voltage to be supplied to the charging unit 102 of the electronic apparatus 100 via the connection units 117 and 108 is adjusted by the AC-DC converter 111.

The control unit 113 includes a memory and a microcomputer (or a microprocessor). The memory stores a program for controlling the power supply unit 112, the display unit 114, the input unit 115, and the communication unit 116, and the microcomputer executes the program. The display unit 114 includes a liquid crystal display (LCD) device or a light emitting diode (LED). The display unit 114 displays an operating status of the charger 110. The display unit 114 also displays a user interface for operating the charger 110, and a user interface for changing a setting of the charger 110. The input unit 115 is provided to input a user instruction for controlling the operation of the charger 110, and to input a user instruction for changing a setting of the charger 110. The communication unit 116 communicates with a communication unit 107 of the electronic apparatus 100 via the connection units 117 and 108. The connection unit 117 is connected to the connection unit 108 of the electronic apparatus 100.

The electronic apparatus 100 is, for example, a digital camera, a mobile phone, a personal computer, a charger, or a battery pack, and enables charging of the battery 101. The electronic apparatus 100 incudes the battery 101, the charging unit 102, a control unit 103, a recording unit 104, a display unit 105, an input unit 106, the communication unit 107, and the connection unit 108.

The battery 101 is a rechargeable battery such as a lithium ion battery. The charging unit 102 receives power supplied from the power supply unit 112 of the charger 110 via the connection units 108 and 117, and controls a charging voltage and a charging current based on the received power to charge the battery 101. The charging unit 102 can change a full charge capacity of the battery 101 by changing a charging condition. In the first exemplary embodiment, the charging condition includes a value that designates at least one of a charging voltage, a charge termination current, and a charging time that are to be used when charging of the battery 101 is controlled.

In a case where the battery 101 is a lithium ion battery, the charging unit 102 charges the battery 101 based on a constant current or a constant voltage. The charging unit 102 can change the full charge capacity of the battery 101, using such a characteristic that the full charge capacity increases as the charging voltage becomes higher.

The charging unit 102 can change the full charge capacity of the battery 101 by changing the charge termination current. For example, in a case where the battery 101 is charged based on the constant voltage, the charging unit 102 can decrease the full charge capacity of the battery 101 by increasing the charge termination current that terminates charging, and the charging unit 102 can increase the full charge capacity of the battery 101 by decreasing the charge termination current.

The charging unit 102 can change the full charge capacity of the battery 101 by changing the charging time. For example, the charging unit 102 can decrease the full charge capacity of the battery 101 by reducing the charging time beginning from charging start to forcible termination of charging, and the charging unit 102 can increase the full charge capacity of the battery 101 by increasing the charging time beginning from charging start to forcible termination of charging.

The charging unit 102 can change the full charge capacity of the battery 101 based on a combination of the plurality of changing methods described above. For example, the charging unit 102 can greatly change the full charge capacity of the battery 101 based on the charging voltage, and can make a fine adjustment to achieve a desired full charge capacity based on the charge termination current.

The control unit 103 includes a memory and a microcomputer (or a microprocessor). The memory stores a program for controlling the battery 101, the charging unit 102, the recording unit 104, the display unit 105, the input unit 106, and the communication unit 107, and the microcomputer executes the program. The recording unit 104 has a function of keeping the operating time of the electronic apparatus 100, and a function of recording the operating time of the electronic apparatus 100 in the memory within the recording unit 104. The operating time of the electronic apparatus 100 indicates the time during which the electronic apparatus 100 operates from a fully charged state to a discharging completed state (a state where the electronic apparatus 100 cannot operate with power supplied from battery 101) of the battery 101. The operating time of the electronic apparatus 100 recorded in the memory within the recording unit 104 is reset to an initial value (e.g., 0), in a case where the battery 101 is charged up to the fully charged state.

The display unit 105 includes an LCD or an LED. The display unit 105 displays an operating status of the electronic apparatus 100. The display unit 105 also displays a user interface for operating the electronic apparatus 100 and a user interface for changing a setting of the electronic apparatus 100. The input unit 106 is provided to input a user instruction for controlling the operation of the electronic apparatus 100, and to input a user instruction for changing a setting of the electronic apparatus 100. The communication unit 107 communicates with the communication unit 116 of the charger 110 via the connection units 108 and 117. The connection unit 108 is connected to the connection unit 117 of the charger 110.

A control method of the electronic apparatus 100 will be described with reference to FIG. 2.

In a case where the electronic apparatus 100 starts operating with power supplied from the battery 101 when the battery 101 is in the fully charged state, the operation of the control unit 103 proceeds to step S201. In step S201, the control unit 103 provides an instruction to the recording unit 104, so that the recording unit 104 starts counting the operating time of the electronic apparatus 100 based on the instruction from the control unit 103. Further, the recording unit 104 periodically records the operating time of the electronic apparatus 100 in the memory within the recording unit 104. In step S201, the charging condition set in the charging unit 102 is a first charging condition.

In step S202, the control unit 103 determines whether to shift the electronic apparatus 100 to a power off state. For example, in a case where the battery 101 reaches the discharging completed state or in a case where the power off state is selected by a power switch of the electronic apparatus 100, the control unit 103 determines to shift the electronic apparatus 100 to the power off state. In a case where the electronic apparatus 100 is not to be shifted to the power off state (NO in step S202), the control unit 103 returns to step S201. In a case where the electronic apparatus 100 is to be shifted to the power off state (YES in step S202), the control unit 103 proceeds to step S203.

In step S203, the control unit 103 measures a voltage of the battery 101.

In step S204, the control unit 103 calculates a remaining operable time of the electronic apparatus 100 based on the voltage of the battery 101 measured in step S203.

In step S205, the control unit 103 calculates an operable time of the electronic apparatus 100 based on the operating time recorded in the memory within the recording unit 104 and the remaining operable time calculated in step S204. For example, the control unit 103 calculates the operable time of the electronic apparatus 100 by adding the operating time recorded in the memory within the recording unit 104 to the remaining operable time calculated in step S204.

In step S206, the control unit 103 determines whether the operable time calculated in step S205 is more than or equal to a predetermined threshold. Here, the predetermined threshold is either a value stored beforehand in the memory within the control unit 103 or a value calculated by the control unit 103 based on an operating condition input by a user via the input unit 106.

In a case where the operable time calculated in step S205 is more than or equal to the predetermined threshold (YES in step S206), the control unit 103 shifts the electronic apparatus 100 to the power off state, and the flowchart in FIG. 2 ends. In this case, the first charging condition is maintained as the charging condition of the charging unit 102. As a result, the charging unit 102 can charge the battery 101 based on the first charging condition, in a case where the electronic apparatus 100 is connected to the charger 110 in a state where the commercial power supply 120 is connected to the charger 110. On the other hand, in a case where the operable time calculated in step S205 is not more than or equal to the predetermined threshold (NO in step S206), the control unit 103 proceeds to step S207.

In step S207, the control unit 103 determines a second charging condition. The second charging condition is a charging condition in which the full charge capacity of the battery 101 is greater than that in the first charging condition. The first charging condition includes a value that designates at least one of a first charging voltage, a first charge termination current, and a first charging time that are to be used when charging of the battery 101 is controlled. The second charging condition includes a value that designates at least one of a second charging voltage, a second charge termination current, and a second charging time that are to be used when charging of the battery 101 is controlled.

In a case where the first charging condition is the first charging voltage, the second charging condition is the second charging voltage higher than the first charging voltage. In a case where the first charging condition is the first charge termination current, the second charging condition is the second charge termination current smaller than the first charge termination current. In a case where the first charging condition is the first charging time, the second charging condition is the second charging time longer than the first charging time.

In step S208, the control unit 103 changes the charging condition set in the charging unit 102 to the second charging condition determined in step S207. As a result, the charging unit 102 can charge the battery 101 based on the second charging condition determined in step S207, in a case where the electronic apparatus 100 is connected to the charger 110 in a state where the commercial power supply 120 is connected to the charger 110.

FIG. 3 is a graph illustrating a relationship between the number of charge/discharge cycles of the battery 101 and the operable time of the electronic apparatus 100.

A horizontal axis of the graph illustrated in FIG. 3 indicates the number of charge/discharge cycles of the battery 101. A vertical axis of the graph illustrated in FIG. 3 indicates the operable time of the electronic apparatus 100 from a charging completed state to a discharging completed state of the battery 101, and indicates the operable time calculated in step S205 in FIG. 2.

The battery 101 is a lithium ion battery supporting high voltage, and can be charged at 4.35 V. The battery 101 can be charged at a lower charging voltage, but in this case, the operable time of the electronic apparatus 100 becomes shorter because the full charge capacity of the battery 101 becomes smaller.

A characteristic 301 illustrated in FIG. 3 indicates a relationship between the number of charge/discharge cycles of the battery 101 and the operable time of the electronic apparatus 100, in a case where the charging unit 102 charges the battery 101 at 4.35 V regardless of a period of use. In the characteristic 301, an initial operable time of the electronic apparatus 100 is about 18 hours. The battery 101 deteriorates as the number of charge/discharge cycles of the battery 101 increases. In a case where the number of charge/discharge cycles of the battery 101 is 400, the operable time of the electronic apparatus 100 decreases to about 12 hours. In a case where the charging unit 102 charges the battery 101 at a high voltage, the initial operable time of the electronic apparatus 100 is longer. In this case, however, the battery 101 tends to deteriorate more quickly than in a case where the battery 101 is charged at a low voltage.

A characteristic 302 illustrated in FIG. 3 indicates a relationship between the number of charge/discharge cycles of the battery 101 and the operable time of the electronic apparatus 100, in a case where the charging unit 102 charges the battery 101 at 4.20 V regardless of a period of use. In the characteristic 302, an initial operable time of the electronic apparatus 100 is about 15.5 hours that is shorter than about 18 hours in the case where the battery 101 is charged at 4.35 V. The battery 101 deteriorates as the number of charge/discharge cycles of the battery 101 increases. In a case where the number of charge/discharge cycles of the battery 101 is 300, the operable time of the electronic apparatus 100 decreases to about 12 hours. In a case where the number of charge/discharge cycles of the battery 101 is 600, the operable time of the electronic apparatus 100 decreases to about 11.5 hours, and this is almost the same as that in the case where the battery 101 is charged at 4.35 V.

In the first exemplary embodiment, a predetermined operable time of the electronic apparatus 100 is, for example, 12 hours. The charging unit 102 controls the charging voltage based on the operable time of the electronic apparatus 100 so that the predetermined operable time can be ensured even if the period of use of the electronic apparatus 100 exceeds two years. For example, the charging unit 102 charges the battery 101 at a low voltage of 4.20 V as in the characteristic 302, before the operable time of the electronic apparatus 100 falls below a predetermined threshold (e.g., 13 hours), so that the deterioration of the battery 101 is prevented. Subsequently, the charging unit 102 charges the battery 101 at a high voltage of 4.35 V as in a characteristic 303, after the operable time of the electronic apparatus 100 falls below the predetermined threshold (e.g., 13 hours), so that the operable time of 12 hours or more of the electronic apparatus 100 is ensured. In this case, the number of charge/discharge cycles of the battery 101 that enables the electronic apparatus 100 to operate for 12 hours or more is about 600, and this is 1.5 times greater than about 400 that is the number of charge/discharge cycles of the battery 101 in the case where the battery 101 is charged at 4.35 V.

According to the first exemplary embodiment, before the operable time of the electronic apparatus 100 falls below the predetermined threshold, the charging unit 102 charges the battery 101 based on the first charging condition in which the full charge capacity of the battery 101 is smaller, so that the deterioration of the battery 101 is prevented. Further, after the operable time of the electronic apparatus 100 falls below the predetermined threshold, the charging unit 102 charges the battery 101 based on the second charging condition in which the full charge capacity of the battery 101 is greater, so that the life of the battery 101 can be extended. The electronic apparatus 100 can extend the life of the battery 101.

Second Exemplary Embodiment

Various functions, processes, or methods described above in the first exemplary embodiment can also be implemented by a personal computer, a microcomputer, a central processing unit (CPU), or a microprocessor, with a program. In a second exemplary embodiment to be described below, a personal computer, a microcomputer, a CPU, or a microprocessor will be referred to as a "computer X". In the second exemplary embodiment, a program for controlling the computer X and also for implementing various functions, processes, or methods described in the first exemplary embodiment will be referred to as a "program Y".

The various functions, processes, or methods described in the first exemplary embodiment are implemented by the computer X executing the program Y. In this case, the program Y is supplied to the computer X via a computer-readable storage medium. The computer-readable storage medium in the second exemplary embodiment includes at least one of a hard disk drive, a magnetic storage device, an optical storage device, a magneto-optical storage device, a memory card, a volatile memory, and a nonvolatile memory. The computer-readable storage medium in the second exemplary embodiment is a non-transitory storage medium.

While aspects of the present disclosure are described with reference to exemplary embodiments, it is to be understood that the aspects of the present disclosure are not limited to the exemplary embodiments. The scope of the following claims is to be accorded the broadest interpretation so as to encompass all modifications and equivalent structures.

This application claims priority from Japanese Patent Application No. 2019-096768, filed May 23, 2019, which is hereby incorporated by reference herein in its entirety.

What is claimed is:

1. An electronic apparatus comprising:
a charging unit configured to charge a battery; and
a control unit configured to (a) control the charging unit to charge the battery based on a first charging condition, in a case where an operable time of the electronic apparatus from a charging completed state to a discharging completed state is not less than a predetermined threshold, and (b) control the charging unit to charge the battery based on a second charging condition in which a full charge capacity of the battery is greater than in the first charging condition, in a case where an operable time of the electronic apparatus from a charging completed state to a discharging completed state is less than the predetermined threshold.

2. The electronic apparatus according to claim 1, wherein the control unit is configured to calculate an operable time of the electronic apparatus based on a voltage of the battery and an operating time of the electronic apparatus.

3. The electronic apparatus according to claim 1, wherein the first charging condition includes a value that designates at least one of a charging voltage, a charge termination current, and a charging time that are to be used when charging of the battery is controlled.

4. A method comprising:
causing a charging unit of an electronic apparatus to charge a battery;
controlling the charging unit to charge the battery based on a first charging condition, in a case where an operable time of the electronic apparatus from a charging completed state to a discharging completed state is not less than a predetermined threshold; and
controlling the charging unit to charge the battery based on a second charging condition in which a full charge capacity of the battery is greater than in the first charging condition, in a case where an operable time of the electronic apparatus from a charging completed state to a discharging completed state is less than the predetermined threshold.

5. A non-transitory storage medium storing a program for causing a computer to execute a method, the method comprising:
causing a charging unit of an electronic apparatus to charge a battery;
controlling the charging unit to charge the battery based on a first charging condition, in a case where an operable time of the electronic apparatus from a charging completed state to a discharging completed state is not less than a predetermined threshold; and
controlling the charging unit to charge the battery based on a second charging condition in which a full charge capacity of the battery is greater than in the first charging condition, in a case where an operable time of the electronic apparatus from a charging completed state to a discharging completed state is less than the predetermined threshold.

* * * * *